Nov. 3, 1936. W. H. FRANK ET AL 2,059,987
ELECTRICAL DISTRIBUTION SYSTEM
Filed March 25, 1935 3 Sheets-Sheet 2
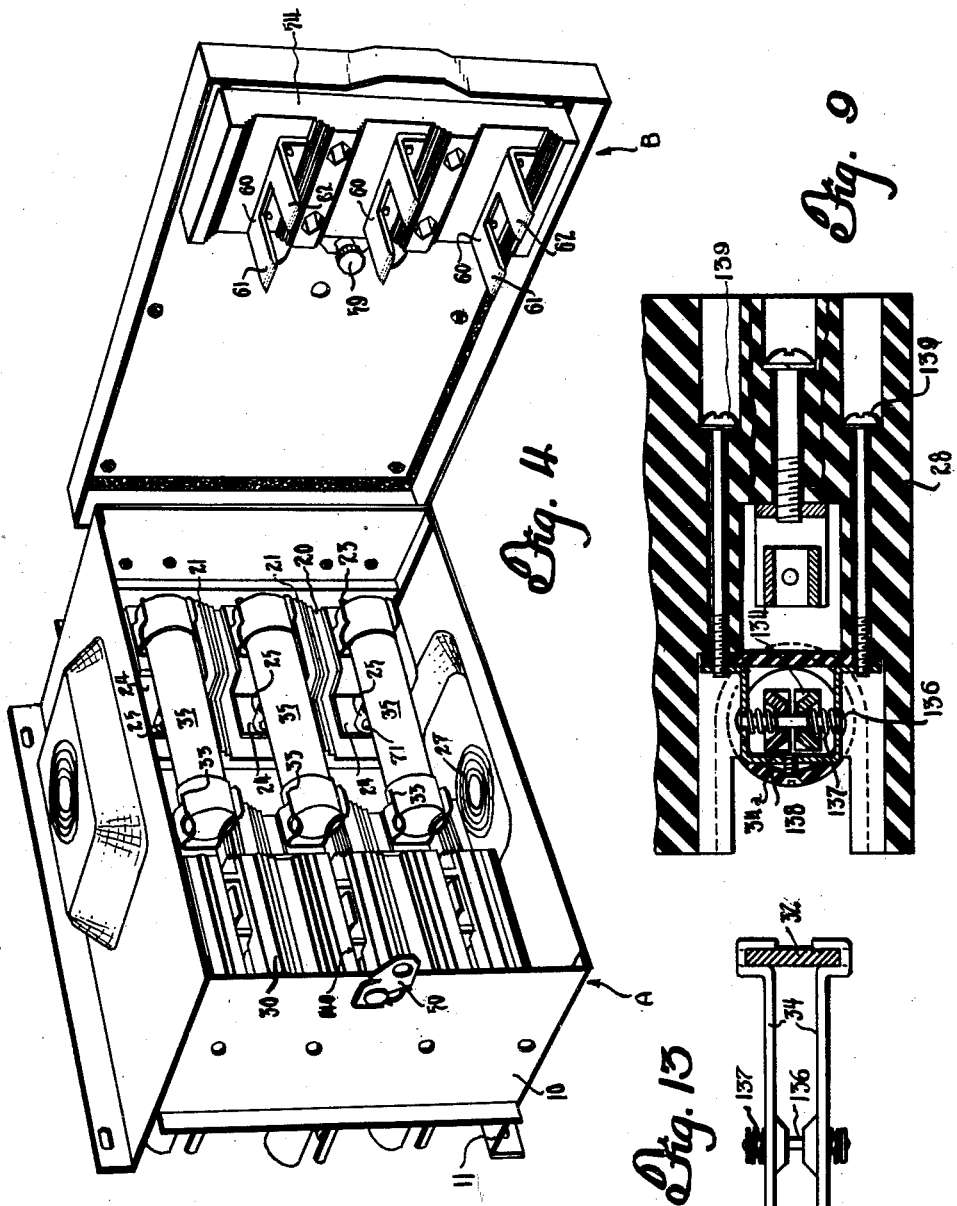
INVENTORS.
William H. Frank
& Joseph W. Harper.
BY
Daniel G. Kullen
ATTORNEY.

Nov. 3, 1936. W. H. FRANK ET AL 2,059,987
ELECTRICAL DISTRIBUTION SYSTEM
Filed March 25, 1935 3 Sheets-Sheet 3
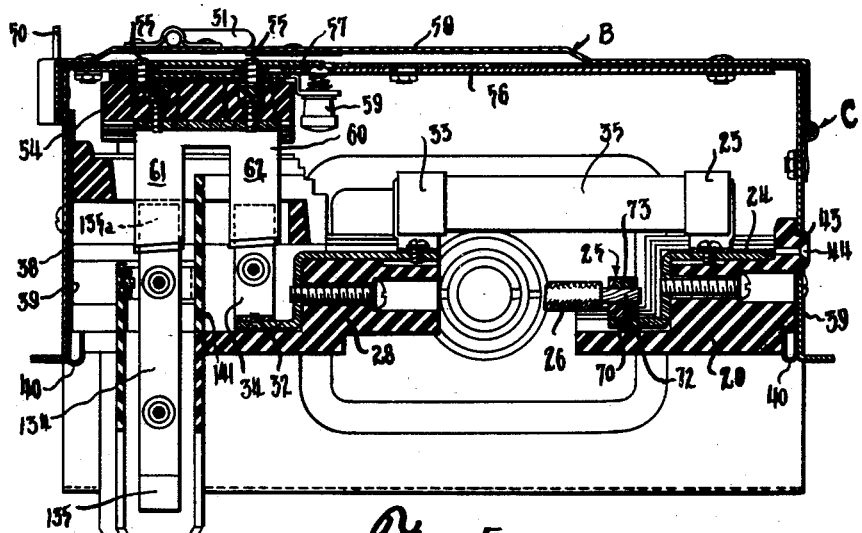
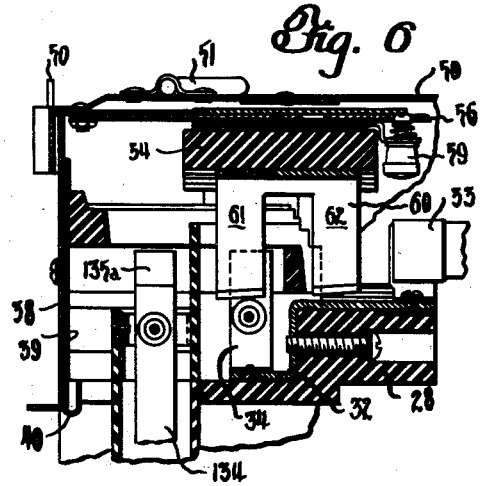
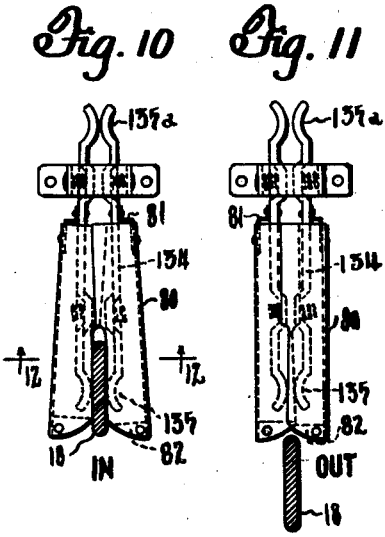
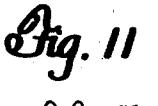
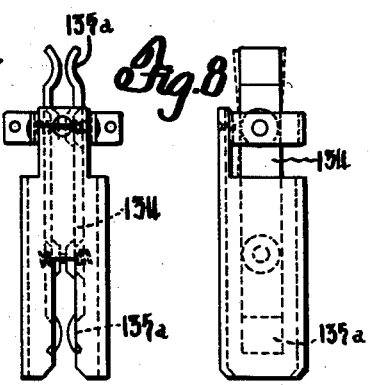
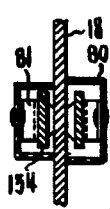
INVENTORS.
William H. Frank
& Joseph W. Harper
BY Daniel G. Kullen
ATTORNEY.

Patented Nov. 3, 1936

2,059,987

UNITED STATES PATENT OFFICE 2,059,987

ELECTRICAL DISTRIBUTION SYSTEM

William H. Frank and Joseph W. Harper, Detroit, Mich.

Application March 25, 1935, Serial No. 12,756

8 Claims. (Cl. 247—3)

This application relates to electrical distribution systems. It more particularly relates to novel interchangeable current take-off devices used in connection with bus ducts.

The device here shown is in the nature of a fused switch to which branch circuit conductors may be connected, and which may be manipulated conveniently, safely, and repeatedly, to connect or disconnect the branch circuit conductors with respect to the bus bars. The device here shown generally comprises an open bottom box-like body adapted to be removably associated with the bus duct in a dust-proof manner and stationary when so associated and having contact fingers for engaging the bus bars. The contact fingers are supported on the sides of the box or body and have integral stationary contact clips adapted to be connected through other stationary contact clips and through fuses, also supported on the sides of the body, to the branch circuit conductors, and for interconnecting the contact clips of the contact fingers to the second mentioned contact clips so as to close the circuits from the bus bars to the conductors there is provided a head or cover hingedly connected to the body and provided with a slide block carrying U-shaped bridging contacts which may be moved to bridge the sets of stationary contact clips of the stationary body and close the circuits through them. The slide block carrying the bridging contacts is movably mounted on the hinged head so as to be capable of assuming two positions; in one position the bridging contacts will bridge the stationary contact clips when the head is swung towards the body, to form a cover therefor, and in another position the bridging contacts will not bridge the stationary contact clips when the head is swung into covering position. Means are provided for properly indexing and latching the slide block in the desired position on the head; means are also provided whereby the position of the bridging contacts with respect to the stationary contact clips will be revealed externally of the device even when the cover is closed; and means are also provided for latching the head or cover in closing position on the body.

Details and features of the device here shown constitute important objects of the inventions of this application, and these details will best be understood upon reference to the appended drawings. In these drawings, Fig. 1 shows a swinging head slide contact form of current take-off device, in top plan view and in position on the bus duct;

Fig. 4 shows the device pe se in perspective view with the swinging head open and with the movable bridging contacts in circuit closing position;

Fig. 5 is an elevational section view as if on the broken line 5—5 of Fig. 1 with the swinging head closed and with the movable bridging contacts in circuit closing position;

Fig. 6 is a fragmentary view similar to that of Fig. 5 but showing the movable bridging contacts in circuit open position;

Figs. 7 and 8 are right angularly related views of a duplex contact member formed at one end with contact fingers for engagement with the bus bars of the duct and formed at the other end with contact clips adapted to be engaged by a prong of the movable bridging contact of the swinging head;

Fig. 9 is a section as if on the line 9—9 of Fig. 2;

Figs. 10 and 11 show a contact member per se provided with an arc choking shroud;

Fig. 12 is a section as if on line 12—12 of Fig. 10;

Fig. 13 shows a modified manner of associating a contact clip and a conducting strap.

Figure 1:
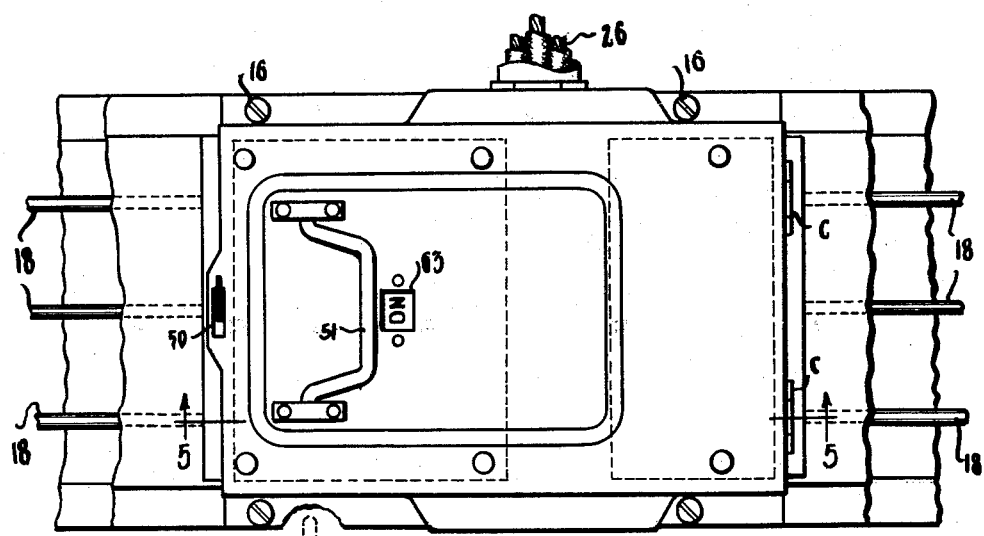
Figure 2:
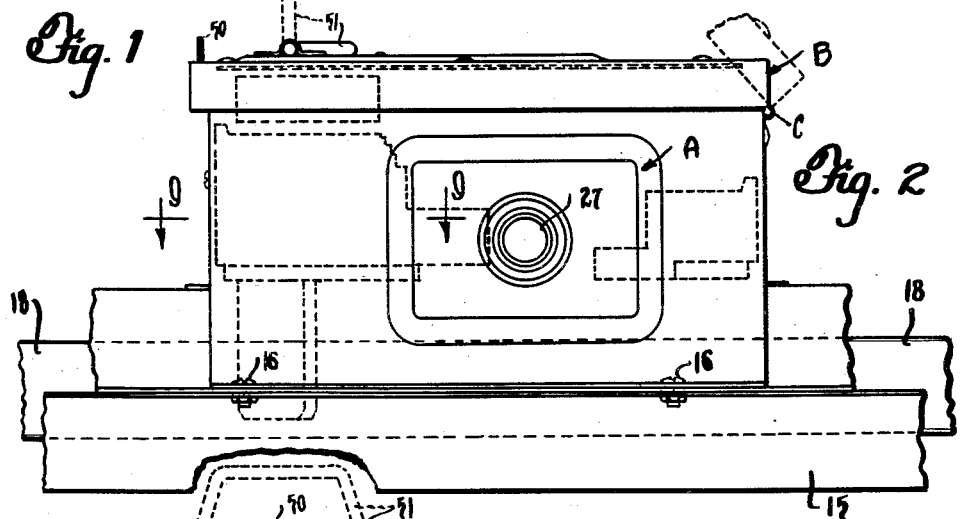
Fig. 2 shows the same in side view.

A bus duct system comprises duct run and branch circuit take-off devices. Since the bus duct run of this case is by now well known, the bus duct run of this case will not now be shown, except in such fragments as are necessary to illustrate features of the branch circuit take-off device here shown in detail.

The system of this case comprises bus duct runs equipped with branch circuit take-off devices of various sorts, and one of these devices will now be described in detail, with reference to its co-operation with the duct shown here.

The device here shown comprises two major parts, namely, a body A and a head B, and the latter is hingedly connected to the body by means of hinges C whereby it may be swung towards or from the body and close or open the latter as desired.

The body comprises a sheet metal box 10 having an open bottom and top and having downwardly extending sides 11 which fit on opposite sides 15 of the duct and are bolted thereto by the bolts 16 which pass through the duct flanges 17 and connect the duct halves. The holes for these bolts 16 are so positioned with respect to uniformly spaced access holes or crescent shaped openings of the duct, through which contact fingers of the body may pass, that proper alignment of these contact fingers with the duct access holes for engaging the bus bars 18 is assured by tightening of the bolts 16.

Inside the body box 10, at the end near the hinges C, is a vitreous insulation connection block 20 having partitions 21 which divide it into cells in which are disposed fuse clips 23 and connection straps 24 provided with cable terminal lugs 25 of the solderless type hereinafter to be described in detail.

Connected to these lugs are the bared terminals of cables 26 which passes out of the sheet metal box 10 through a selected one of the knock-outs 27 in draw-outs of opposite sides of the box 10. At the opposite end of the box 10 is a vitreous insulation contact block 28 having partitions 30 dividing it into cells corresponding in number to the cells of the connection block 20. The cells of the contact block receive connection straps 32 and fuse clips 33, and to the straps 32 are secured the bights of U-shaped contact clips 34, these comprising one of the two sets of stationary contact clips of the body A. The bights of the clips 34 are secured to the straps 32 by screws, as in Fig. 6, or in the full floating manner shown in Fig. 13, wherein ends of the clips are received in notches of the straps 32. The blocks 20 and 30 are supported from the sides 11 of the box, inasmuch as the bottom and top of the box are open, and all of the parts are designed with this thought in mind. This is particularly true of the blocks which are grooved in such a manner that the grooves extend in the direction of the screws which secure the blocks to the sides of the box.

In slots on the ends of the connection block 28 are duplex contact members 134 formed of straps whose ends are shaped to provide contact fingers 135 and contact clips 135a, the straps being resiliently and full floatingly supported and reinforced at two points between their ends by means of transverse pins 136 provided with pressure reinforcing springs 137, substantially as shown in Figs. 9 and 13. The contact straps are enclosed within insulating protecting tubes 34a carried by a supporting strap 138 through which the pins 136 pass in a manner to support the duplex contact members 134, and the supporting strap 138 is insulatedly mounted on the contact block 28 through the medium of mounting screws 139.

Figure 3:
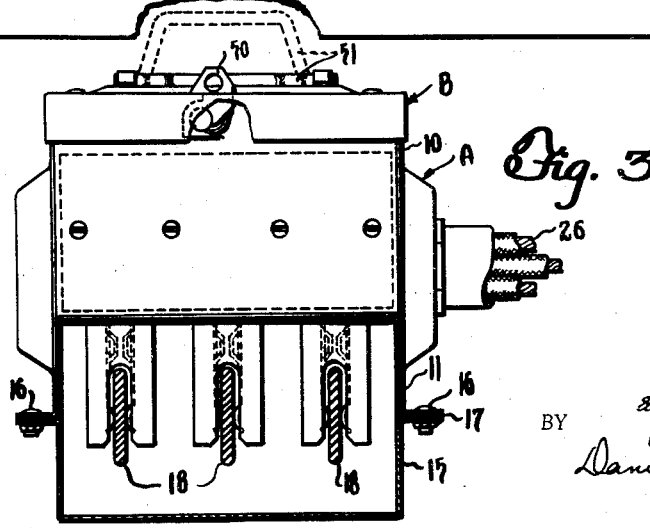
Fig. 3 shows the same in left end view.

The contact fingers 135 engage the bus bars 18, as shown in Fig. 3, and the clips 135a provide the second set of stationary contact clips for the body A; for this purpose the clips 135a are aligned with the first set of stationary contacts provided by the contact clips 34.

The contact block 28 is formed to shield the contact clips 34 and 135a completely except for deep narrow slots 140 in line with the alined entrances to these contact clips, and accidental engagement with the contact clips is thus prohibited. Between the clips 34 and 135a there is provided a barrier or shield 141 and the same cooperate with shoulders of the blocks to separate and isolate the clips 34 from the clips 135a.

Fuses 35 are disposed in the box and these bridge the fuse clips 23 in the connection block and the fuse clips 33 in the contact block to complete the circuit from the clips 34 to the cables 26.

The blocks 20 and 28 are protected from shock and from direct contact with the sheet metal box 10 by means of a felt liner 38 and a felt strip 39, the latter having an edge 40 doubled back to form a loop which is exposed at the bottom of the box 10 to form a gasket for the latter and complete the dust-proof closure effected by the latter when it is fixedly positioned on the duct, as shown in Fig. 3, with clips 135 of the duplex contact members 134 in engagement with the bus bars 18.

The blocks 20 are provided with integral bosses 43 projecting through holes in the end of the box 10, and these bosses have fine holes 44 therethrough which afford access from outside the device to the connection straps 24 for the reception of fuse test leads which will engage the load side straps 24; fuse testing may thus be accomplished readily and easily from the load side of the device.

As has been stated above, the head B is hingedly mounted on the body A, the fastenings being in the nature of hinges C, and when the head is swung into position on the body it closes the open top box 10; a spring latch referenced generally 50 and manually manipulable is provided for latching the head B in closing position on the body, and a pivotal bail 51 is provided to facilitate swinging of the head from and towards the body.

Slidably mounted on the head near the end thereof that matches the end of the box 10 containing the contact block 28 is a slide block 54 of vitreous insulation.

The latter is provided with pins and spacers 55 which ride in guide slots formed in a plate 56 secured to the head B, and a plate 57 into which thread the pins 55 rides in the space between the plate 56 and a draw-out portion 58 of the plate B, whereby the slide block 54 will be guided in its movement along the head. The plate 56 is also provided with holes for the reception of a spring actuated manipulable indexing pin 59 resiliently carried by the slide block 54 to index the latter in either of the two positions shown in Figs. 5 and 6, and it is here observed that the cooperation of the pins 55 and the guide slots of plate 56 is such that a considerable amount of play is provided for the slide block 54 in its movement and in its on and off positions, whereby the U-shaped bridging contacts 60 mounted on the block and having prongs 61—62 may have a full floating movement with respect to the head B and the body clips 34 and 135a which are also mounted to "float".

The draw-out portion 57 of the head B is provided with a transparent window 63 through which on and off markings on the plate 57 carried by the slide block pins 55 may be viewed, these markings indicating which of the two indexed positions is occupied by the slide block and its contacts 60.

When the slide block is in the position of Fig. 5, prongs 61 engage the clips 135a, and prongs 62 engage the clips 34 when the head B is swung towards the body. With the parts in this position, the circuits from the bus bars to the branch circuit conductors will be completed.

However, if the slide block 54 is moved to the position of Fig. 6, the clips 135a will not be engaged by the prongs 61 and the circuits from the bus bars to the branch circuit cables will not be closed. Under such circumstances, though prongs 61 will make with clips 34, clips 135a and prongs 62 will be electrically free of one another and consequently the circuits will remain open. The engagement of prongs 61 and clips 34 will help hold the cover closed, though closing no electrical circuit.

The terminal lugs 25 may be in the form of cup-shaped hollow metal blocks having integral shanks 70 riveted over through holes of the straps 24 and may have aligned apertures 71 through which may be passed the bared terminal ends 72 of the cables 26, these being clamped in place by the set screws 73 threaded into the cups of the lugs 25.

It will be observed that while the insulation tubes 34a operate to quench arcs that may be formed when the clips 135 of the contact members 134 are separated from the bus bars 18 of the duct, nevertheless these tubes might not operate as efficiently as desired. Consequently, an arc choking shroud of the type shown in Figs. 10-12 may be employed. This shroud comprises trough-like closures 80 resiliently mounted at 81 on the contacts 134 and having end closing portions 82 which cooperate to form complete closures around the contacts 134 as shown in Figs. 10-12.

Now having described the device here shown, reference should be had to the appended claims for a determination of the monopoly sought to be covered herein.

We claim:

1. An electrical distribution system comprising elongated bus duct having an entrance through which a prong may be inserted for direct contact with a bar, and a branch circuit take off device comprising a switch having a body and a movable cover, the body having a pair of aligned contacts longitudinally spaced along the duct, one of them being connected to the bus bar by means of a bus bar engaging prong of the body entering the duct through the entrance, and the other being connected to a branch conductor, the cover having a bridging contact adapted to bridge the body contacts when in one position and when the cover is closed, and movable longitudinally along the duct from that position so as not to bridge the body contacts even when the cover is closed, the cover contact being slidably mounted on the cover so as to be reciprocable from one to the other of its two positions in the line of the contacts without being removed from the cover.

2. An electrical distribution system comprising elongated bus duct having an entrance through which a prong may be inserted for direct contact with a bar, and a branch circuit take off device comprising a switch having a body and a movable cover, the body having a pair of contacts, one of them being connected to the bus bar by means of a bus bar engaging prong of the body entering the duct through the entrance, and the other being connected to a branch conductor, the cover having a bridging contact adapted to bridge the body contacts when in one position and when the cover is closed and movable from that position so as not to bridge the body contacts even when the cover is closed, the cover contact being movably mounted on the cover so as to be movable from one to the other of its two positions without being removed from the cover.

3. An electrical distribution system comprising elongated bus duct having an entrance through which a prong may be inserted for direct contact with a bus bar, and a branch circuit take off device comprising a body in the nature of an open bottom and open top box provided with sides engaging and fixed to opposite sides of the duct and having a pair of alined contacts supported on a block mounted on and connecting the sides of the box and to one of which a branch circuit conductor may be connected, the other of the body contacts being connetced to a bus bar through a prong entering the duct entrance and engaging a bus bar, the device also comprising a cover mounted on the box and closing its open top and having a bridging contact adapted to bridge the body contacts when in one position and when the cover is closed to connect the engaged bus bar and the branch circuit conductor, and movable from that position so as not to bridge the body contacts even when the cover is closed, the cover contact being movably mounted on the cover so as to be movable without being removed from the cover, the open bottom of the box being closed by the duct.

4. An electrical distribution system comprising elongated bus duct having an entrance through which a prong may be inserted for direct contact with a bus bar, and a branch circuit take off device comprising a body in the nature of an open bottom and open top box provided with sides engaging and fixed to opposite sides of the duct and having a pair of alined contacts longitudinally spaced along the duct and supported on a block mounted on and connecting the sides of the box and to one of which a branch circuit conductor may be connected through a fuse in the body, the other of the body contacts being connected to a bus bar through a prong entering the duct entrance and engaging a bus bar, the device also comprising a cover mounted on the box and closing its open top and having a bridging contact adapted to bridge the body contacts when in one position and when the cover is closed to connect the engaged bus bar and the branch circuit conductor, and movable from that position so as not to bridge the body contacts even when the cover is closed, the cover contact being slidably mounted on the cover and along the longitudinal run of the duct so as to be reciprocable along the duct without being removed from the cover, the open bottom of the box being closed by the duct.

5. An electrical distribution system comprising elongated bus duct having an entrance through which a prong may be inserted for direct contact with a bus bar, and a branch circuit take off device comprising a body in the nature of an open bottom and open top box provided with sides engaging and fixed to opposite sides of the duct and having a pair of alined contacts supported on a block mounted on and connecting the sides of the box and to one of which a branch circuit conductor may be connected, the other of the body contacts being connected to a bus bar through a prong entering the duct entrance and engaging a bus bar, the device also comprising a cover mounted on the box and closing its open top and having a bridging contact adapted to bridge the body contacts when in one position and when the cover is closed to connect the engaged bus bar and the branch circuit conductor, and movable from that position so as not to bridge the body contacts even when the cover is closed, the cover contact being movably mounted on the cover so as to be movable without being removed from the cover, the open bottom of the box being closed by the duct and a fuse in circuit with the bus bar, the aligned contacts, the prong, and the bridging contact and supported on a block mounted on and connecting the sides of the box.

6. An electrical distribution system comprising elongated bus duct having an entrance through which a prong may be inserted for direct contact with a bus bar, and a branch circuit take off device comprising a body in the nature of an open bottom and open top box provided with side engaging and fixed to opposite sides of the duct and having a pair of alined contacts supported on a block mounted on and connecting the sides of the box and to one of which a branch circuit conductor may be connected, the other of the body contacts being connected to a bus bar through a prong entering the duct entrance and engaging a bus bar, the device also comprising a cover mounted on the box and closing its open top and having a bridging contact adapted to bridge the body contacts when in one position and when the cover is closed to connect the engaged bus bar and the branch circuit conductor, and movable from that position so as not to bridge the body contacts even when the cover is closed, the cover contact being movably mounted on the cover so as to be movable without being removed from the cover, the open bottom of the box being closed by the duct, and a fuse in circuit with the bus bar, the aligned contacts, the prong, and the bridging contact and supported on a block mounted on and connecting the sides of the box, the fuse extending longitudinally of the duct run.

7. An electrical distribution system comprising elongated bus duct having an entrance through which a prong may be inserted for direct contact with a bus bar, and a branch circuit take off device comprising a body fixed to the duct and having a pair of contacts and to one of which a branch circuit conductor may be connected, the other of the body contacts being connected to a bus bar through a prong entering the duct entrance and engaging a bus bar, the device also comprising a cover having a bridging contact movably mounted thereon and adapted to bridge the body contacts when the cover is closed and the contact is in one of its two positions to connect the engaged bus bar and the branch circuit conductor, the contact being movable, independently of the cover, to be out of bridging relation to the body contacts.

8. An electrical distribution system comprising elongated bus duct having an entrance through which a prong may be inserted for direct contact with a bus bar, and a branch circuit take off device comprising a body in the nature of an open bottom and open top box provided with sides engaging and fixed to opposite sides of the duct and having a pair of aligned contacts longitudinally spaced along the duct and supported on a block mounted on and connecting the sides of the box and to one of which a branch circuit conductor may be connected through a fuse in the body, the other of the body contacts being connected to a bus bar through a prong entering the duct entrance and engaging a bus bar, the device also comprising a cover mounted on the box and closing its open top and having a bridging contact adapted to bridge the body contacts when in one position and when the cover is closed to connect the engaged bus bar and the branch circuit conductor, and movable from that position so as not to bridge the body contacts even when the cover is closed, the cover contact being slidably mounted on the cover and along the longitudinal run of the duct so as to be reciprocable along the duct without being removed from the cover, the open bottom of the box being closed by the duct, and a fuse in circuit with the bus bar, the aligned contacts, the prong, and the bridging contact and supported on a block mounted on and connecting the sides of the box, the fuse extending longitudinally of the duct run.

WILLIAM H. FRANK.
JOSEPH W. HARPER.